United States Patent [19]
Abe et al.

[11] Patent Number: 5,073,590
[45] Date of Patent: Dec. 17, 1991

[54] THEMOPLASTIC RESIN COMPOSITION AND PROCESS FOR PRODUCING THE SAME

[75] Inventors: Hiroomi Abe; Taichi Nishio, both of Chiba; Kiyoshi Mitsui, Ichihara; Satoru Sogabe, Chiba; Takashi Sanada, Ichihara, all of Japan

[73] Assignee: Sumitomo Chemical Company, Limited, Osaka, Japan

[21] Appl. No.: 698,337

[22] Filed: May 7, 1991

Related U.S. Application Data

[63] Continuation of Ser. No. 418,203, Oct. 6, 1989, abandoned.

[30] Foreign Application Priority Data

Oct. 15, 1988 [JP] Japan ............................... 63-260297

[51] Int. Cl.$^5$ ..................... C08L 77/00; C08K 3/00
[52] U.S. Cl. ..................... 524/449; 524/451; 525/66; 525/179
[58] Field of Search .............. 525/66, 179; 524/451, 524/449

[56] References Cited

U.S. PATENT DOCUMENTS 4,554,320 11/1985 Reimann et al. ................ 525/183
4,780,505 10/1988 Mashita et al. .................. 525/179

FOREIGN PATENT DOCUMENTS 180302 5/1986 European Pat. Off. .
279578 8/1988 European Pat. Off. .
330015 8/1989 European Pat. Off. .
60-188457 2/1986 Japan .

OTHER PUBLICATIONS

*Patent Abstracts of Japan, vol. 10, No. 36 (C-328) (2093), Feb. 10, 1986.

Primary Examiner—Ana L. Carrillo
Attorney, Agent, or Firm—Stevens, Davis, Miller & Mosher

[57] ABSTRACT

A thermoplastic resin composition is obtained by blending 100 parts by weight of a resin blend consisting of 10 to 90% by weight of at least one polypropylene type resin (A) selected from the group consisting of modified polypropylenes and compounds composed of modified polypropylenes and polypropylenes, and 90 to 10% by weight of a polyamide resin (B); 2 to 30 parts by weight of an epoxy group containing copolymer (C) and 2 to 100 parts by weight of an ethylene-$\alpha\beta$-unsaturated carboxylic acid alkyl estermaleic anhydride terpolymer (D).

The composition can easily be processed into a molded product, a film, a sheet or the like by a conventional processing method such as injection molding and extrusion molding. The resulting product has a very good balance in physical properties such as heat resistance, coating properties, impact strength and flexural modulus. The composition of this invention is useful in the fields of automobiles, electric industry and electronic industry.

10 Claims, No Drawings

THERMOPLASTIC RESIN COMPOSITION AND PROCESS FOR PRODUCING THE SAME

This application is a Continuation of application Ser. No. 07/418,203, filed Oct. 6, 1989 now abandoned.

The present invention relates to a novel thermoplastic resin composition which can be utilized in the form of molded articles, sheets, films, etc. through injection molding, extrusion molding, etc. More particularly, it relates to a novel thermoplastic resin composition having a good balance in physical properties, beautiful appearance and excellent coating properties, which is obtained by blending a polypropylene resin and a polyamide resin with an epoxy group containing copolymer and an ethylene-$\alpha,\beta$-unsaturated carboxylic acid alkyl ester-maleic anhydride terpolymer.

Polypropylenes have heretofore been widely used in the form of molded articles, films, sheets, etc. because of their good molding processability, toughness, resistances to water, gasoline, chemicals, etc., low specific gravity and cost effectiveness.

They, however, are poor in heat resistance, stiffness, impact resistance, coating properties, adhesive properties, printability, etc., which should be improved. This defect is an obstacle to opening-up of new avenues of practical use for them.

For improving the heat resistance, stiffness and impact strength, there have been developed composit polypropylenes containing rubbers or reinforcing materials. However, blending a reinforcing material for improving the heat resistance and stiffness greatly reduces the impact strength, and it does not raise the temperature that the resulting composite polypropylene resists up to the melting point of the polypropylene contained therein. Although blending rubber improves the impact resistance, it deteriorates the heat resistance and the surface hardness. Thus, improving the balance in physical properties of composite polypropylenes has been substantially impossible.

On the other hand, polyamide resins are widely used in the fields of automobile parts and electric and electronic parts, as engineering resins having a characteristically high heat resistance, stiffness, strength, oil resistance and the like, but it is desirable to further improve their molding processability, impact resistance, water resistance, chemical resistance, etc. In addition, they have inherent disadvantages in that they have a higher specific gravity and are more expensive than polyolefins.

From such a viewpoint, blending a polypropylene type resin selected from modified polypropylenes and compounds composed of modified polypropylenes and polypropylenes with a polyamide resin would give a thermoplastic resin having the characteristics of both the polypropylene resin and the polyamide resin whose various new uses can be expected.

However, it has heretofore been considered that the compatibility and dispersability between polypropylene resins and polyamide resins are very poor. In fact, mere mixing of the above two resins involves the following problems.

(1) Barus effect of molten polymer is remarkable, so that stable taking-off of extruded strand is substantially impossible, resulting in a very low molding workability.

(2) There can be obtained only an injection-molded product which has an extreme nonuniformity and an ugly appearance due to formation of flow marks. Thus, the product cannot be used in practice in automobile parts, electric and electronic parts, etc.

(3) The mechanical properties, in particular, impact resistance, tensile elongation, etc., of a molded product made of a mixture of a polypropylene resin and a polyamide resin often have values lower than those usually expected from the additivity of the respective physical properties of the polypropylene resin and the polyamide resin.

(4) Polypropylenes are inherently poor in coating properties, adhesive properties and printability. Therefore, although these properties are somewhat improved by blending a polyamide resin, those of the product obtained by mere mixing are not stable.

An object of the present invention is to provide a novel thermoplastic resin composition having excellent coating properties, a very good balance in physical properties such as molding processability, stiffness, heat resistance, impact resistance, scratch resistance, oil resistance, chemical resistance, water resistance, etc., and a very uniform and smooth appearance.

According to the present invention, there are provided a thermoplastic resin composition comprising 100 parts by weight of a resin blend consisting of 10 to 90% by weight of at least one polypropylene type resin (A) selected from the group consisting of modified polypropylenes and compounds composed of modified polypropylenes and polypropylenes, and 90 to 10% by weight of a polyamide resin (B); 2 to 30 parts by weight of an epoxy group containing copolymer (C); 2 to 100 parts by weight of an ethylene-$\alpha,\beta$-unsaturated carboxylic acid alkyl ester-maleic anhydride (D); and optionally an inorganic filler (E); and a process for producing said thermoplastic resin composition.

The polypropylene type resin (A) used in this invention is a resin selected from the group consisting of modified polypropylenes and compounds composed of modified polypropylenes and polypropylenes.

In this invention, the polypropylene refers to a crystalline polypropylene and includes propylene homopolymers and block or random copolymers obtained by copolymerizing propylene with at least one $\alpha$-olefin such as ethylene or butene-1.

The homopolymers, block copolymers or random copolymers can be obtained, for example, by reacting the starting materials in the presence of a chemical complex of a titanium trichloride and an alkylaluminum compound which is usually called Ziegler-Natta catalyst.

In this invention, the modified polypropylene is obtained by modifying the homopolymer, the block copolymer or the random copolymer by grafting thereon an unsaturated carboxylic acid or a derivative thereof or a combination of an unsaturated carboxylic acid or a derivative thereof and an unsaturated aromatic monomer in the presence of a free-radical initiator.

The graft modification in the presence of an unsaturated aromatic monomer yields a modified polypropylene with small fluidity change (melt flow rate change) before and after the graft modification. The modified polypropylene thus obtained has a large amount of unsaturated carboxylic acid or derivative thereof grafted and excellent physical properties.

Specific examples of the unsaturated carboxylic acid used for graft modification for obtaining the modified polypropylene in the present invention are acrylic acid, methacrylic acid, maleic acid, itaconic acid, citraconic acid, bicyclo[2,2,1]hepta-5-ene-2,3-dicarboxylic acid (himic acid), bicyclo[2,2,2]-octa-5-ene2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo[2,2,1]octa-7-ene-2,3,5,6-tetracarboxylic acid, 7-oxabicyclo[2,2,1]-hepta-5-ene-2,3-dicarboxylic acid, etc. The derivatives of unsaturated carboxylic acid includes acid anhydrides, esters, amides, imides and metal salts of the unsaturated carboxylic acids mentioned above. Specific examples thereof are maleic anhydride, itaconic anhydride, citraconic anhydride, bicyclo[2,2,1]hepta-5-ene-2,3-dicarboxylic acid anhydride (himic acid anhydride: NBDA), monoethyl maleate, monomethyl fumarate, monomethyl itaconate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate, etc.

Of these, maleic anhydride is most preferably used.

As the unsaturated aromatic monomer used in the modified polypropylene, styrene is most preferable. There can be also used o-methylstyrene, p-methylstyrene, m-methylstyrene, α-methylstyrene, vinyltoluene, vinylbenzene and mixtures thereof.

Although the modified polypropylene can be produced in the absence of a free-radical initiator, it is usually preferably produced in the presence of a free-radical initiator. As the free-radical initiator, well known ones can be used. The free-radical initiator includes, for example, azo compounds such as 2,2'-azobisisobutyronitirle, 2,2'-azobis(2,4,4-trimethylvaleronitrile), etc.; organic peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumen hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxyisobutyrate, t-butylperoxypivalate, t-butylperoxy-2-ethylhexanoate, t-butylperoxy-3,5,5-trimethylhexanoate, t-butylperoxylaurate, t-butylperoxybenzoate, di-t-butyldiperoxyisophthalate, 2,5-dimethyl-2,5-di(benzoylperoxy)hexane, t-butylperoxymaleic acid, t-butylperoxyisopropylcarbonate, polystyrene peroxide and the like.

For grafting the graft monomer(s) on a polypropylene, various conventional methods can be employed.

There can be employed, for example, a method comprising mixing polypropylene, graft monomer(s) and a radical-generating agent and melt-kneading the resulting mixture in a melt-kneading apparatus to graft the graft monomer(s); a method comprising dissolving polypropylene in an organic solvent such as xylene, adding thereto a radical-generating agent under nitrogen atmosphere, carrying out the reaction with heating and stirring, cooling the reaction mixture, washing filtration and drying to obtain a graft polypropylene; a method comprising irradiating polypropylene with ultraviolet light or radiation in the presence of graft monomer(s); and a method comprising bringing polypropylene into contact with oxygen or ozone in the presence of graft monomer(s).

In consideration of economical benefit and the like, it is most preferable to employ the method comprising melt-kneading in a melt-kneading apparatus and thereby carrying out graft copolymerization.

A polypropylene can be melt-kneaded with an unsaturated carboxylic acid, a derivative thereof or a combination of an unsaturated carboxylic acid or a derivative thereof and an unsaturated aromatic monomer, and if necessary, a free-radical initiator at a temperature of 150° to 300° C., preferably 190° to 280° C. for a residence time of 0.3 to 10 minutes, preferably 0.5 to 5 minutes with an extruder, Banbury mixer, kneader, etc. It is industrially advantageous to employ a method in which a graft polypropylene is continuously produced by a single- or twin-screw extruder while keeping the vent holes vacuous and while removing unreacted components (unsaturated carboxylic acid or derivative thereof, unsaturated aromatic monomer, free-radical initiator, etc.), by-products such as oligomers and decomposition products of these components. Although the reaction may be carried out in air, it is preferably carried out in an inert gas such as nitrogen or carbon dioxide. It is also possible to subject the modified polypropylene obtained to heat treatment at a temperature of 60° C. or higher, solvent extraction, and drawing a vacuum with melting in order to further remove trace amounts of the unreacted components and by-products contained in the modified polypropylene.

If necessary, to the modified polypropylene can be added antioxidants, heat stabilizers, light stabilizers, nucleating agents, lubricants, antistatic agents, inorganic or organic colorants, rust preventives, crosslinking agents, foaming agents, plastisizers, fluorescent agents, surface treating agents, surface brighteners, etc. during the modification or the aftertreatment.

In producing the modified polypropylene, the melt flow rate of a starting polypropylene (a crystalline propylene homopolymer, a crystalline propylene ethylene/α-olefin block copolymer, a crystalline propylene α-olefin random copolymer, or the like) is 0.05–60 g/10 min, preferably 0.1–40 g/10 min. The starting polypropylene is preferably chosen so as to adjust the melt flow rate of the resulting modified polypropylene (A) to 0.1–100 g/10 min, preferably 0.5–50 g/10 min. The number average molecular weight of the starting polypropylene is 7,000 to 800,000, preferably 10,000 to 700,000.

In producing the modified polypropylene, the blending amounts of the individual constituents are as follows. The amount of the unsaturated carboxylic acid or derivative thereof is preferably 0.01 to 10 parts by weight, more preferably 0.1 to 5 parts by weight per 100 parts by weight of the polypropylene. The amount of the unsaturated aromatic monomer is preferably 0.01 to 10 parts by weight, more preferably 0.1 to 5 parts by weight per 100 parts by weight of the polypropylene. The amount of the free-radical initiator is preferably 0 to 5 parts by weight, more preferably 0.001 to 2 parts by weight per 100 parts by weight of the polypropylene. When the amount of the unsaturated carboxylic acid or derivative thereof is less than 0.01 part by weight, the product has no markedly improved quality. When it exceeds 10 parts by weight, the improvement hits the ceiling and no more remarkable effect is brought about. Moreover, the unsaturated carboxylic acid or derivative thereof remains unreacted in a large amount in the resulting polymer and as a result, offensive smell, deterioration of physical properties, etc. occurs. Therefore, both of such amounts are not desirable for practical purposes. When the amount of the unsaturated aromatic monomer is less than 0.01 part by weight, the product has no markedly improved quality. When it exceeds 10 parts by weight, the improvement hits the ceiling. When the amount of the free-radical initiator exceeds 5 parts by weight, the rate of graft reaction of the unsaturated carboxylic acid or derivative thereof is not accelerated any more. Moreover, the decomposition of the polypropylene becomes so serious that the fluidity (melt flow rate) changes greatly. Therefore, such an amount is not desirable for practical purposes.

In this invention, the melt flow rate of the polypropylene type resin (A) selected from the group consisting of modified polypropylenes and compounds composed of modified polypropylenes and polypropylenes is not critical. It is preferably 0.1–100 g/10 min, more preferably 0.5–40 g/10 min.

The polyamide resin (B) in the present invention is a polyamide obtained by polymerization of a lactam having a ring composed of three or more members or a polymerizable ω-amino acid or by polycondensation of a dibasic acid and diamine. Specific examples of the polyamide resin (B) are polymers of ε-caprolactam, aminocaproic acid, enantholactam, 7-aminoheptanoic acid, 11-aminoundecanoic acid, etc.; polymers obtained by polycondensation of a diamine such as hexamethylenediamine, nonamethylenediamine, undecamethylenediamine, dodecamethylenediamine, methaxylylenediamine or the like and a dicarboxylic acid such as terephthalic acid, isophthalic acid, adipic acid, sebacic acid, dodecane dibasic acid, glutaric acid or the like; and copolymers of the above monomers.

More specific examples of the polyamide resin(B) are aliphatic polyamides such as polyamide 6 (poly-ε-caprolactam), polyamide 66 (polyhexamethylene adipamide), polyamide 610 (polyhexamethylene sebacamide), polyamide 11 (poly-11-aminoundecanoic acid), polyamide 12 (polylauric lactam), polyamide 612 (polyhexamethylene dodecanoamide), etc., and aromatic polyamides such as polyhexamethylenediamineterephthalamide, polyhexamethylenediamineisophthalamide, xylene-group-containing polyamides, etc. These polyamides can be used alone or as a mixture thereof. Copolymers of the above-exemplified monomers can also be used.

The molecular weight of the polyamide resin is not critical. the polyamide resin is preferably the one which has a number average molecular weight of 15,000 or less (a relative viscosity of 2.4 or less).

The epoxy group containing copolymer (C) in the present invention is a copolymer obtained from an unsaturated epoxy compound and at least one ethylenic unsaturated compound.

Although the ratio between these compounds in the epoxy group containing copolymer (C) is not critical, the proportion of the unsaturated epoxy compound is preferably 0.1 to 50% by weight, more preferably 1 to 30% by weight, most preferably 5 to 15% by weight.

The unsaturated epoxy compound is a compound having in the molecule an unsaturated group which permits copolymerization with an ethylenic unsaturated compound, and an epoxy group.

The unsaturated epoxy compound includes, for example, unsaturated glycidyl esters and unsaturated glycidyl ethers which are represented by the following formulas (1) and (2), respectively.

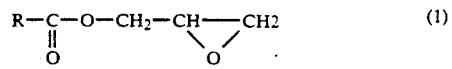

wherein R is a hydrocarbon group of 2–18 carbon atoms containing an ethylenic unsaturated bond.

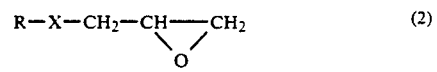

where R is a hydrocarbon group of 2–18 carbon atoms containing an ethylenic unsaturated bond, and X is —CH$_2$—O— or

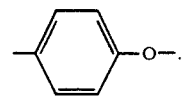

Specific examples of the unsaturated epoxy compound are glycidyl acrylate, glycidyl methacrylate, glycidyl itaconate, allyl glycidyl ether, 2-methyl allyl glycidyl ether, styrene p-glycidyl ether, etc.

The ethylenic unsaturated compound includes, for example, olefins, vinyl esters of saturated carboxylic acids of 2–6 carbon atoms, esters of saturated alcohols of 1–8 carbon atoms and acrylic acid, methacrylic acid, maleic acid or fumaric acid, vinyl halides, styrenes, nitriles, vinyl ethers, acrylamides.

Specific examples of the ethylenic unsaturated compound are ethylene, propylene, butene-1, vinyl acetate, methyl acrylate, ethyl acrylate, methyl methacrylate, diethyl maleate, diethyl fumarate, vinyl chloride, vinylidene chloride, styrene, acrylonitrile, isobutyl vinyl ether, acrylamide, etc. Of these, ethylene is particularly preferred.

As the epoxy group containing copolymer (C) used in the present invention, preferable are copolymers of an unsaturated epoxy compound and ethylene and terpolymers of an unsaturated epoxy compound, ethylene and an ethylenic unsaturated compound other than ethylene. More preferable are glycidyl methacrylate-ethylene-vinyl acetate terpolymers and glycidyl methacrylate-grafted ethylene-vinyl acetate copolymers.

The epoxy group containing copolymers can be produced by various methods. There can be employed either a random copolymerization method in which the unsaturated epoxy compound is introduced into the main chain of copolymer, or a graft copolymerization method in which the unsaturated epoxy compound is introduced as the side chain of copolymer. Specific examples of production process of the epoxy group containing copolymer are a process comprising copolymerizing an unsaturated epoxy compound with ethylene in the presence of a radical-generating agent at 500 to 4,000 atmospheres and at 100° and 300° C. in the presence or absence of suitable solvent and chain transfer agent; a process comprising mixing a polypropylene with an unsaturated epoxy compound and a radical-generating agent, and subjecting the mixture to melt graft copolymerization in an extruder; and a process comprising copolymerizing an unsaturated epoxy compound with an ethylenic unsaturated compound in an inert medium such as water or organic solvent in the presence of a radical-generating agent.

The ethylene-α,β-unsaturated carboxylic acid alkyl ester-maleic anhydride terpolymer (D) in the present invention is a copolymer consisting of monomer units of (a) ethylene, (b) an α,β-unsaturated carboxylic acid alkyl ester, and (c) maleic anhydride. It has a content of (a) ethylene units of preferably 50 to 90% by weight, more preferably 65 to 90% by weight, a content of (b) α,β-unsaturated carboxylic acid alkyl ester units of preferably 6 to 49% by weight, preferably 10 to 35% by weight, and a content of (c) maleic anhydride units of preferably 0.5 to 10% by weight, more preferably 1.0 to 2.5% by weight.

The monomer (b), i.e., the α,β-unsaturated carboxylic acid alkyl ester is an alkyl ester of an unsaturated carboxylic acid having 3 to 8 carbon atoms (e.g. carylic acid, methacrylic acid, etc.). Specific examples of the α,β-unsaturated carboxylic acid alkyl ester are ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, isobutyl methacrylate, etc. Of these, methyl acrylate, ethyl acrylate, n-butyl acrylate and methyl methacrylate are particularly preferable.

In addition to the ethylene-α,β-unsaturated carboxylic acid alkyl ester-maleic anhydride copolymer, the thermoplastic resin composition of this invention may contain an ethylene copolymer obtained by copolymerizing ethylene with a copolymerizable monomer other than the above-mentioned copolymerizable monomers, for example, vinyl acetate, vinyl propionate, etc., so long as the resin composition retains its performance characteristics.

When the content of (a) ethylene units in the terpolymer as component (D) used in this invention is less than 50% by weight, the resulting resin composition of this invention is not satisfactory in cold resistance, in particular, impact resistance at low temperatures and molding processability. When is exceeds 95% by weight, the compatibility of the terpolymer (D) with the polyamide resin is low and the coating properties of the resulting resin composition is unsatisfactory. Moreover, there are brought about adverse effects on the impact resistance of the resulting resin composition and the appearance of molded product. When the content of (b) α,β-unsaturated carboxylic acid alkyl ester units is less than 6% by weight, the coating properties and the impact resistance at low temperatures of the resulting resin composition are deteriorated. When it exceeds 49% by weight, no desirable effect on the cold resistance, in particular, the impact resistance at low temperatures, of the resulting resin composition can be obtained. When the content of (c) maleic anhydride units is less than 0.5% by weight or more than 10% by weight, the cold resistance, in particular, the impact resistance at low temperatures, of the resulting resin composition is deteriorated and there are brought about adverse effects on its molding processability and the appearance of molded product.

The melt index (JIS K6760, 190° C.) of the terpolymer (D) is not critical. It is preferably 0.1–200 g/10 min, more preferably 0.5–100 g/10 min. When it is less than 0.1 g/10 min, the molding processability of the resulting resin composition and the appearance of molded product are deteriorated in some cases. When it exceeds 200 g/10 min, the mechanical properties of the resulting resin composition are deteriorated in some cases.

In the thermoplastic resin composition of this invention, the polypropylene type resin as component (A) is contained in the resin blend in an amount of 10 to 90% by weight, preferably 20 to 80% by weight, more preferably 25 to 55% by weight, based on the weight of the resin blend. When the content of the polypropylene type resin (A) is less than 10% by weight, the molding processability of the resin composition and the toughness, water resistance, chemical resistance and the like of molded product are not sufficient. When it exceeds 90% by weight, desirable heat resistance, strength, stiffness and the like of molded product cannot be attained.

When a compound composed of a modified polypropylene and a polypropylene is used as component (A), the content of the modified polypropylene in this compound is preferably 5% or more. When it is less than 5% by weight, the compatibility and dispersibility of the resin composition is low in some cases and sufficient toughness and impact resistance of molded product cannot be attained in some cases.

The polyamide resin as component (B) is contained in the resin blend in an amount of 90 to 10% by weight, preferably 80 to 20% by weight, more preferably 75 to 45% by weight. The content of the polyamide resin (B) in the resin blend is less than 10% by weight, the heat resistance, stiffness, strength and the like of molded product are not sufficient. When it exceeds 90% by weight, there can not be attained desirable molding processability of the resin composition and desirable stiffness, water resistance, chemical resistance and the like of molded product. From the viewpoint of the coating properties and the fluidity at the time of molding of the resin composition, it is more preferably that the polyamide resin has a number average molecular weight of 15,000 or less (a relative viscosity of 2.4 or less).

In the thermoplastic resin composition of this invention, the epoxy group containing copolymer (C) is contained in an amount of 2 to 30 parts by weight, preferably 3 to 20 parts by weight, more preferably 3 to 15 parts by weight, per 100 parts by weight of the resin blend consisting of the polypropylene type resin (A) and the polyamide resin (B). When the content of the epoxy group containing copolymer (C) is less than 2% by weight, the compatibility and dispersibility of the resin composition is low, the toughness and impact resistance of molded product are not sufficient, and flow marks are formed, resulting in an ugly appearance. Moreover, the extrusion stability of the resin composition is low. When the content exceeds 30 parts by weight, exfoliation take place in a molded product of the resin composition, the stiffness, toughness, impact resistance and the like of molded product are markedly deteriorated, and no desirable result can be obtained.

The terpolymer (D) is contained in the resin composition in an amount of 2 to 100 parts by weight, preferably 5 to 70 parts by weight, more preferably 10 to 50 parts by weight, more preferably 15 to 30 parts by weight, per 100 parts by weight of the resin blend. When the content of the (D) is less than 2 parts by weight, only insufficient improving effect on the coating properties is obtained. When it exceeds 100 parts by weight, the heat resistance and the stiffness of molded product are deteriorated. Therefore, both of such contents are not desirable.

When an inorganic filler (E) is blended, its amount is 5 to 100 parts by weight, preferably 10 to 60 parts by weight, more preferably 25 to 35 parts by weight, per 100 parts by weight of the composition composed of components (A), (B), (C) and (D). For improving the stiffness and the heat resistance of molded product, it is preferable that the inorganic filler (E) has an aspect ratio (an ratio of the major axis to the minor axis) of 5 or more, preferably 10 or more.

The inorganic filler is more preferably a filler of plate shape, for example, talc or mica. An inorganic filler having an average particle size of $4\mu$ or less is most preferable. When the average particle size exceeds $4\mu$, the impact strength of molded product is deteriorated in some cases.

The resin composition of the present invention may be used in admixture with materials other than the above constituents, for example, organic fillers, reinforcing agents, whiskers, fillers such as silica, alumina, $CaCO_3$, etc., pigments such as $TiO_2$, carbon black, etc., flame retardants such as $Sb_2O_3$, etc., lubricants, nucleating agents, plastisizers, dyes, antistatic agents, antioxidants, and weather resistance improvers.

A method for producing the resin composition of the present invention is not critical, and conventional methods can be used.

In general, a method comprising mixing the starting materials in solution followed by evaporation of the solvent or precipitation in a non-solvent is effective. From an industrial viewpoint, a method comprising kneading the starting materials in molten state is usually employed in practice. For the melt-kneading, there can be used conventional kneading apparatus such as Banbury mixer, extruder, roll mill, various kneaders, etc.

In the kneading, it is preferably to mix the resin components all in the form of powder or pellets uniformly and previously in an apparatus such as tumbler or Henschel mixer. If necessary, it is also possible to omit the mixing and feed predetermined amounts of the resin components to a kneading apparatus individually.

The kneaded resin composition is molded by various molding methods such as injection molding, extrusion molding, etc. The present invention includes a method in which the starting materials are dry blended during injection molding or extrusion molding without a step of previous kneading, and kneaded directly during melt processing to obtain a molded product.

In the present invention, the order of kneading is not critical, and components (A), (B), (C), (D) and (E) may be kneaded in one lot. It is preferable to knead components (B) and (E) at first and then knead therewith components (A), (C) and (D).

The following examples serve to give specific illustration of the practice of the present invention but they are not intended in any way to limit the scope of the present invention. In the examples, the tensile test was carried out according to JIS K7113 and the flexural test (thickness: 3.2 mm) according to JIS K7203. The Izod impact strength (thickness: 3.2 mm) was measured according to JIS K7110.

The modified polypropylenes and the epoxy group containing copolymers used in Examples and Comparative Examples were obtained in the following manners. As polypropylenes and polyamide resin, commercially available ones were used.

(1) Modified polypropylene (1)

Produced according to the process disclosed in JP-B-56-9925.

Polypropylene, maleic anhydride and t-butylperoxylaurate were previously mixed. An extruder having a screw diameter of 30 mm and a L/D ratio of 28 was adjusted to a ballel temperature of 230° C., and the mixture obtained in the above was fed through a hopper and extruded at a screw revolution rate of 60 r.p.m. The molten strand of modified polypropylene extruded from the die of the extruder was cooled with water and then pelletized. The product thus obtained had an amount of maleic anhydride grafted of 0.08% by weight and a melt flow rate of 30 g/10 min.

(2) Modified polypropylene (2)

Produced in the same manner as for modified polypropylene (1) except for previously mixing polypropylene, maleic anhydride, styrene and 1,3-bis(t-butylperoxyisopropyl)benzene. The product had an amount of maleic anhydride grafted of 0.15% by weight and a melt flow rate of 25 g/10 min.

(3) Polypropylenes

Propylene homopolymer: Sumitomo Noblen® W501 (mfd. by Sumitomo Chemical Co., Ltd.) was used.

Propylene-ethylene/propylene block copolymer: Sumitomo Noblen® AW564 (mfd. by Sumitomo Chemical Co., Ltd.) was used.

(4) Polyamide resins

Nylon 6: Unitika Nylon A-1020BRL
Unitika Nylon A-1025
Unitika Nylon A-1030BRL (all mfd. by UNITIKA, Ltd.)
Nylon 66: Ube Nylon 2020B (mfd. by Ube Industries, Ltd.)

(5) Epoxy Group Containing Copolymers

A glycidyl methacrylate-ethylene copolymer and a glycidyl methacrylate-ethylene-vinyl acetate terpolymer were produced according to the processes disclosed in JP-A-47-23490 and JP-A-48-11388.

Using a 40-liters stainless steel reactor equipped with suitable feed opening, withdrawing opening and stirrer which reactor permitted temperature control, copolymerization was carried out with stirring at 1,400 to 1,600 atmospheres and at 180° to 200° C. while continuously feeding glycidyl methacrylate, ethylene, vinyl acetate, a free-radical initiator and a chain transfer agent.

A glycidyl methacrylate-grafted ethylene-vinyl acetate copolymer was produced according to, for example, the process disclosed in JP-B-55-12449.

A previously prepared solution of dicumyl peroxide in glycidyl methacrylate was mixed with ethylene-vinyl acetate copolymer pellets, and diffused and infiltrated thereinto at room temperature. Subsequently, the pellets impregnated with glycidyl methacrylate were extruded at a tip temperature of 170° C. with a vented extruder whose die had an inner diameter of 65 mm, whereby epoxy group containing copolymer pellets were obtained by graft copolymerization.

(6) Ethylene Copolymers

The following ethylene copolymers were used. Of these, Bondine® can be produced by the processes disclosed in French Patent No. 1323379 and French Patent Application No. 81/01430.

Bondine® AX8040 (mfd. by Sumika CdF Chimie Co., Ltd.) (E/EA/MAH=72.8/26/1.2 by weight, MI: 9 g/10 min)

Bondine® TX8030 (mfd. by Sumika CdF Chimie Co., Ltd.) (E/EA/MAH=87.5/10/2.5 by weight, MI: 4.4 g/10 min)

Bondine® LX4110 (mfd. by Sumika CdF Chimie Co., Ltd.) (E/EA/MAH=91.85/5.0/3.15 by weight)

Bondine® AX8060 (mfd. by Sumika CdF chimie Co., Ltd.) (E/EA/MAH=90.7/26/3.3 by weight)

Acryft® WA3036-04 (mfd. by Sumitomo Chemical Co., Ltd.) (E/MMA=70/30 by weight, MI: 5 g/10 min)

Here, E. EA, MAH and MMA denote ethylene, ethyl methacrylate, maleic anhydride and methyl methacrylate, respectively.

(7) Inorganic Fillers

The following inorganic fillers were used.

Talc, MW 5000S (mfd, by HAYASHI KASEI CO., LTD., average particle size: $3\mu$)

Mica, KURARAY Mica 325HK (mfd. by Kuraray Co., Ltd., average particle size: $30\mu$)

Mica, Super Vite® (mfd. by WANDO KOGYO CO., LTD., average particle size: $2.7\mu$)

EXAMPLE 1

Materials selected from those described above were blended according to the recipe shown in Table 1, melt-kneaded at a temperature of 260° C. with a twin screw kneader (TEX-44, mfd. by JAPAN STEEL WORKS, LTD.), cooled, pelletized, dried at 120° C. for 4 hours, and then made into test pieces for measuring physical properties, with an injection molding machine (Toshiba Model IS 150E-V) having a clamping pressure of 150 tons, at a molding temperature of 260° C. and at a die temperature of 80° C. Table 1 shows the test results obtained for the test piece thus obtained. As to the evaluation of the degree of adhesion of coating layer, there were used an acryl urethane coating material, Soflex® 5300 (mfd. by Kansai Paint Co., Ltd.) and Plagloss® K1100 (mfd. by Nippon Oils and Fats Co., Ltd.) as a primer, and after baking at 80° C. for 30 minutes, the initial degree of adhesion of coating layer was measured.

COMPARATIVE EXAMPLE 1

The same procedure as in Example 1 was repeated except that the recipe was changed as shown in Table 1. The results obtained are shown in Table 1.

EXAMPLE 2

The same procedure as in Example 1 was repeated except that as shown in Table 1, modified polypropylene and unmodified homopolypropylene (Sumitomo Noblen® W501, mfd. by Sumitomo Chemical Co.) were simultaneously used. The results obtained are shown in Table 1.

EXAMPLE 3

The same procedure as in Example 1 was repeated except that modified polypropylene (2) was used in place of modified polypropylene (1). The recipe and the results obtained are shown in Table 1.

As shown in Examples 1 to 3 and Comparative Example 1, employing an ethylene copolymer is found to improve the impact resistance and surprisingly, greatly improve the coating properties of the product without remarkably changing the heat resistance and flexural modulus.

In Comparative Example 1, employing a polypropylene alone gives a product having higher coating properties than those of composite polypropylene materials. However, it gives a product of unstable degree of adhesion of coating layer. Therefore, the process of coating would become troublesome because employment of an exclusive primer for polypropylene is necessary and a pretreatment such as chlorothen treatment is required in some cases.

The primer used in Examples 1 and 2 and Comparative Example 1 was a primer widely used for Nylon and polyester, and is easy to handle in coating. It gave the results shown in Table 1 after only such a simple pretreatment as degreasing with isopropyl alcohol.

EXAMPLE 4

The same procedure as in Example 1 was repeated except that particles were produced according to the blending proportions shown in Table 2 by feeding a preblend of talc (MW5000S, mfd by HAYASHI KASEI Co., Ltd. average particle size: $3.0\mu$, average aspect ratio: 10) and a Nylon 6 (Unitika Nylon A-1025, number average molecular weight: 14,000) through the first hopper, feeding a preblend of the other materials through the second hopper which is provided between a vent hole and the first hopper, and carrying out the melt-kneading, the feeling rates of both preblends being controlled with a gravimetric feeder. Table 2 shows the results.

EXAMPLE 5

The same procedure as in Example 4 was repeated except that mica (Super Vite®, mfd. by WANDO KOGYO Co., Ltd., average particle size: $2.7\mu$, average aspect ratio: 20) was used in place of the talc.

COMPARATIVE EXAMPLE 2

The same procedure as in Example 5 was repeated except that the materials were preblended in one lot and fed through the first hopper.

COMPARATIVE EXAMPLE 3

The same procedure as in Example 5 was repeated except that mica (SUZORITE® 325HK, mfd. by Kuraray Co , Ltd., average particle size: $40\mu$, average aspect ratio: 15) was used in place of the mica (Super Vite®).

The recipes and the results are shown in Table 2 for all of Examples 4 and 5 and Comparative Examples 2 and 3.

As can be seen from the results of Examples 4 and 5 and Comparative Examples 2 and 3, surprisingly, a method comprising melt-kneading a Nylon and a filler at first and then melt-kneading therewith the other materials improved all of the flexural modulus, impact strength and H.D.T.

Mica having a large average particle size is not desirable because although it tends to improve the flexural modulus, it deteriorates the impact strength seriously.

EXAMPLE 6

The same procedure as in Example 5 was repeated except that the recipe was changed as shown in Table 3.

COMPARATIVE EXAMPLES 4 to 6

The same procedure as in Example 6 was repeated except that in place of Bondine ® AX8040 (E/EA/MAH=72.8/26/1.2 by weight) used in Example 6, Bondine ® LX4110 (E/EA/MAH=91.85/5.0/3.15 by weight), Bondine ® TX8030 (E/EA/MAH=87.5/10/2.5 by weight) or Acryft ® WA3036-04 (E/MMA=70/30 by weight) was used as ethylene copolymer in Comparative Example 4, 5 or 6, respectively.

Table 3 shows the results of evaluating the degree of adhesion of coating layer in Example 6 and Comparative Examples 4, 5 and 6.

As is clear from Table 3, when the content of an $\alpha,\beta$-unsaturated carboxylic acid alkyl ester component such as EA or MMA in ethylene copolymer is less than 6% by wieght, the degree of adhesion of coating layer is low in some cases. The content is preferably 10% by weight or more.

EXAMPLE 7

The same procedure as in Example 4 was repeated except that the recipe was changed as shown in Table 4.

COMPARATIVE EXAMPLE 7

The same procedure as in Example 7 was repeated except that Acryft ® WA3036-04 containing no maleic anhydride was used as ethylene copolymer.

EXAMPLE 8

The same procedure as in Example 7 was repeated except that Bondine ® AX8060 (E/EA/MAH=90.7/26/3.3 by weight) was used as ethylene copolymer.

Table 4 shows the results of Examples 7 and 8 and Comparative Example 7. As is clear from Table 4, the impact strength can be further improved by adding maleic anhydride in the form of ethylene copolymer. But too high a maleic anhydride content is not desirable from the viewpoint of melt fluidity.

EXAMPLE 9

The same procedure as in Example 4 was repeated except that the recipe was changed as shown in Table 5.

COMPARATIVE EXAMPLE 8

The same procedure as in Example 9 was repeated except that the epoxy group containing copolymer was omitted and that the blending proportions of the other constituents were as shown in Table 5.

Table 5 shows the results of Example 9 and Comparative Example 8.

The resin composition containing no epoxy group containing copolymer gave a molded product which was inferior in all the physical properties, namely, which possessed a deteriorated heat resistance, impact strength and flexural modulus.

EXAMPLES 10 to 12

The same procedure as in Example 4 was repeated except that as polyamide 6, Unitika Nylon A-1020BRL (number average molecular weight: 12,000, relative viscosity: 2.05), Unitika Nylon ® A-1025 (number average molecular weight: 14,000, relative viscosity: 2.3) or Unitika Nylon A-1030BRL (number average molecular weight: 17,500, relative viscosity: 2.6) was used in Example 10, 11 or 12, respectively, and that the blending proportions shown in Table 6 was employed.

Table 6 also shows the results of measurement of the melt fluidity (melt flow rate). As is clear from Table 6, when the molecular weight of polyamide 6 is too high, the fluidity tends to be deteriorated. The number average molecular weight of polyamide 6 is preferably 15,000 or less. The relative viscosity of Nylon 6 was measured at a polymer concentration of 1 g/100 ml, at 96% $H_2SO_4$ and at 25° C. The number average molecular weight was measured by terminal group analysis.

TABLE 1

| | Modified polypropylene wt % | Polypropylene | Polyamide[*1] wt % | Epoxy group containing copolymer[*2] wt % | Ethylene copolymer[*3] wt % | Flexural properties | |
|---|---|---|---|---|---|---|---|
| | | | | | | Flexural modulus kg/cm$^2$ | Flexural strength kg/cm$^2$ |
| Example 1 | Modified polypropylene (1) 30 | — | 40 | 10 | 20 | 11200 | 390 |
| Comparative Example 1 | Modified polypropylene (1) 50 | — | 40 | 10 | — | 13100 | 410 |
| Example 2 | Modified polypropylene (1) 20 | 10 | 40 | 10 | 20 | 12000 | 420 |
| Example 3 | Modified polypropylene (2) 30 | — | 40 | 10 | 20 | 10200 | 360 |

| | Izod impact strength | | H.D.T. (4.6 kg/cm$^2$) °C. | Degree of adhesion of coating layer |
|---|---|---|---|---|
| | Notched kg cm/cm | Unnotched kg cm/cm | | |
| Example 1 | 12.3 | >100 | 125 | 100/100 |
| Comparative Example 1 | 5.4 | >100 | 130 | 34/100 |
| Example 2 | 13.7 | >100 | 127 | 100/100 |
| Example 3 | 15.8 | >100 | 122 | 100/100 |

[*1] Polyamide 66: Ube Nylon 2020B
[*2] Epoxy group containing copolymer: glycidyl methacrylate-ethylene-vinyl acetate (10-85-5 by weight)
[*3] Ethylene copolymer: Bondine ® AX8040

TABLE 2

| | Modified polypropylene (1) wt % | Poly-[1] propylene | Polyamide[2] wt % | Epoxy group containing copolymer wt % | Ethylene copolymer wt % | Filler wt % | Flexural properties | |
|---|---|---|---|---|---|---|---|---|
| | | | | | | | Flexural modulus kg/cm$^2$ | Flexural strength kg/cm$^2$ |
| Example 4 | 16 | 8 | 32 | 8 | 16 | 20[3] | 21000 | 540 |
| Example 5 | 16 | 8 | 32 | 8 | 16 | 20[4] | 23300 | 540 |
| Comparative Example 2 | 16 | 8 | 32 | 8 | 16 | 20[4] | 15900 | 460 |
| Comparative Example 3 | 16 | 8 | 32 | 8 | 16 | 20[5] | 30000 | 560 |

| | Izod impact strength | | H.D.T. (4.6 kg/cm$^2$) °C. | Degree of adhesion of coating layer |
|---|---|---|---|---|
| | Notched Kg cm/cm | Unnotched Kg cm/cm | | |
| Example 4 | 9.1 | >100 | 145 | 100/100 |
| Example 5 | 6.5 | 60 | 140 | 100/100 |
| Comparative Example 2 | 5.5 | 70 | 120 | 100/100 |
| Comparative Example 3 | 3.2 | 30 | 147 | 100/100 |

[1]Polypropylene: Sumitomo Noblen ® W501
[2]Polyamide 6: Unitika Nylon A-1025
[3]Talc: MW5000S mfd. by HAYASHI KASEI Co., Ltd.
[4]Mica: Super Vite ® mfd. by WANDO KOGYO Co., Ltd.
[5]Mica: SUZORITE ® 325HK mfd. by KURARAY Co., Ltd.

TABLE 3

| | Modified polypropylene (1) wt % | Poly-[1] propylene | Poly-[2] amide wt % | Epoxy group containing copolymer wt % | Ethylene copolymer wt % | Filler[3] wt % | Degree of adhesion of coating layer |
|---|---|---|---|---|---|---|---|
| Example 6 | 20 | 14 | 32 | 4 | 10 | 20 | 100/100 |
| Comparative Example 4 | 20 | 14 | 32 | 4 | 10[4] | 20 | 0/100 |
| Comparative Example 5 | 20 | 14 | 32 | 4 | 10[5] | 20 | 40/100 |
| Comparative Example 6 | 20 | 14 | 32 | 4 | 10[6] | 20 | 100/100 |

[1]Polypropylene: Sumitomo Noblen ® AY630 (block copolymer) mfd. by Sumitomo Chemical Co., Ltd.
[2]Polyamide 66: Ube Nylon 2020B, mfd. by Ube Industries, Ltd.
[3]Filler: Mica Super Vite ® mfd. by WANDO KOGYO Co., Ltd.
[4]Ethylene copolymer: Bondine ® LX4110
[5]Ethylene copolymer: Bondine ® TX8030
[6]Ethylene copolymer: Acryft ® WA3036-04

TABLE 4

| | Modified polypropylene (1) wt % | Poly-propylene | Polyamide[1] wt % | Epoxy group containing copolymer wt % | Ethylene copolymer wt % | Filler[3] wt % | Flexural properties | |
|---|---|---|---|---|---|---|---|---|
| | | | | | | | Flexural modulus Kg/cm$^2$ | Flexural strength Kg/cm$^2$ |
| Example 7 | 28 | — | 38 | 2 | 12[2] | 20 | 22500 | 600 |
| Comparative Example 7 | 28 | — | 38 | 2 | 12[4] | 20 | 24500 | 610 |
| Example 8 | 28 | — | 38 | 2 | 12[5] | 20 | 2300 | 600 |

| | Izod impact strength | | H.D.T. (4.6 Kg/cm$^2$) °C. | Degree of adhesion of coating layer | Melt flow rate (load: 10 kg) |
|---|---|---|---|---|---|
| | Notched Kg cm/cm | Unnotched Kg cm/cm | | | |
| Example 7 | 11.1 | >100 | 140 | 100/100 | 13.8 |
| Comparative Example 7 | 6.3 | 60 | 145 | 100/100 | 40.3 |
| Example 8 | 12.0 | >100 | 142 | 100/100 | 9.2 |

[1]Polyamide 6: Unitika Nylon A-1025
[2]Ethylene copolymer: Bondine ® AX8040
[3]Talc: MW 5000S mfd. by HAYASHI KASEI Co., Ltd.
[4]Ethylene copolymer: Acryft ® WA 3036-04
[5]Ethylene copolymer: Bondine ® AX8060

TABLE 5

| | Modified polypropylene (1) wt % | Poly-propylene | Polyamide[1] wt % | Epoxy group containing copolymer wt % | Ethylene[2] copolymer wt % | Filler[3] wt % |
|---|---|---|---|---|---|---|
| Example 9 | 21 | — | 38 | 4 | 12 | 25 |
| Comparative | 25 | — | 38 | — | 12 | 25 |

TABLE 5-continued

Example 8

| | Flexural properties | | Izod impact strength | | H.D.T. |
|---|---|---|---|---|---|
| | Flexural modulus Kg/cm$^2$ | Flexural strength Kg/cm$^2$ | Notched Kg cm/cm | Unnotched Kg cm/cm | (4.6 Kg/cm$^2$) °C. |
| Example 9 | 23300 | 580 | 10.3 | >100 | 155 |
| Comparative Example 8 | 20600 | 530 | 9.0 | >100 | 137 |

*[1]Polyamide 6: Unitika Nylon A-1025
*[2]Ethylene copolymer: Bondine ® AX8040
*[3]Talc: MW 5000S mfd. by HAYASHI KASEI Co., Ltd.
*[4]Ethylene copolymer: Acryft ® WA3036-04

TABLE 6

| | Modified Polypropylene (1) wt % | Polyamide 6 wt % | Epoxy group containing copolymer wt % | Ethylene copolymer wt % | Talc wt % | Melt flow rate 230° C., 10 Kg-load |
|---|---|---|---|---|---|---|
| Example 9 | 18 | 45*[1] | 2 | 12 | 23 | 15 |
| Example 10 | 18 | 45*[2] | 2 | 12 | 23 | 10 |
| Example 11 | 18 | 45*[3] | 2 | 12 | 23 | 3 |

*[1]Unitika Nylon A-1020BRL
*[2]Unitika Nylon A-1025
*[3]Unitika Nylon A-1030BRL As described above, the thermoplastic resin composition of this invention is markedly advantageous in having an excellent molding processability and in giving a molded product of high quality, in particular, a product of good coating properties and balance among impact strength, heat resistance and flexural modulus.

The novel thermoplastic resin composition provided according to the present invention can easily be processed into a molded product, a film, a sheet or the like by a processing method used for conventional thermoplastic resins, for example, injection molding, extrusion molding or the like. Moreover, the product obtained by the processing has a very good balance in physical properties such as heat resistance, coating properties, impact strength, flexural modulus, etc. The thermoplastic resin composition of this invention can be used in the fields of automobiles, electric industry and electronic industry.

What is claimed is:

1. A thermoplastic resin composition comprising
100 parts by weight of a resin blend consisting of 10 to 90% by weight of at least one polypropylene resin (A) selected from the group consisting of modified polypropylene and compositions consisting of modified polypropylenes and polypropylenes, and 90 to 10% by weight of a polyamide resin (B);
2 to 30 parts by weight of an epoxy group containing copolymer (C); and
2 to 100 parts by weight of an ethylene-α,β-unsaturated carboxylic acid alkyl ester-maleic anhydride terpolymer (D),
wherein the modified polypropylene is a polypropylene modified by grafting with 0.01 to 10 parts by weight of an unsaturated carboxylic acid or the derivative thereof or with 0.01 to 10 parts by weight of an unsaturated carboxylic acid or the derivative thereof and 0.01 to 10 parts by weight of an unsaturated aromatic monomer per 100 parts by weight of the polypropylene.

2. A thermoplastic resin composition according to claim 1, which further comprises an inorganic filler (E) in an amount of 5 to 100 parts by weight per 100 parts by weight of the composition.

3. A thermoplastic resin composition according to claim 1, wherein the epoxy group containing copolymer (C) is a copolymer of an unsaturated epoxy compound and ethylene, or a terpolymer of an unsaturated epoxy compound, ethylene and an ethylenically unsaturated compound other than ethylene.

4. A thermoplastic resin composition according to claim 1, wherein the ethylene-α,β-unsaturated carboxylic acid alkyl ester-maleic anhydride terpolymer (D) is a terpolymer comprising (a) 50 to 90% by weight of ethylene units, (b) 6 to 49% by weight of α,β-unsaturated carboxylic acid alkyl ester units and (c) 0.5 to 10% by weight of maleic anhydride units.

5. A thermoplastic resin composition according to claim 1, wherein the ethylene-α,β-unsaturated carboxylic acid alkyl ester-maleic anhydride terpolymer (D) is a terpolymer comprising (a) 65 to 90% by weight of ethylene units, (b) 10 to 35% by weight of α,β-unsaturated carboxylic acid alkyl ester units and (c) 1.0 to 2.5% by weight of maleic anhydride units.

6. A thermoplastic resin composition according to claim 2, wherein the filler (E) is talc or mica.

7. A thermoplastic resin composition according to claim 6, wherein the average particle size of the talc is 0.4μ or less.

8. A thermoplastic resin composition according to claim 2, wherein the inorganic filler (E) has an average aspect ratio of 5 or more.

9. A thermoplastic resin composition according to claim 1, wherein the polyamide resin (B) has a number average molecular weight of 15,000 or less (a relative viscosity of 2.4 or less).

10. A process for producing a thermoplastic resin composition according to claim 2, which comprises melt-kneading a polyamide resin (B) and an inorganic filler (E) at first, and then melt-kneading therewith a polypropylene resin (A), an epoxy group containing copolymer (C) and an ethylene-α,β-unsaturated carboxylic acid alkyl ester-maleic anhydride terpolymer (D).

* * * * *